(12) United States Patent
Hwang et al.

(10) Patent No.: US 11,168,765 B2
(45) Date of Patent: Nov. 9, 2021

(54) POWER TRANSMISSION APPARATUS FOR HYBRID ELECTRIC VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Soonki Eo, Ansan-si (KR); Ilhan Yoo, Hwaseong-si (KR); Dongwoo Kim, Incheon (KR); Yong Sug Choi, Hwaseong-si (KR); Jong Hyo Park, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 7 days.

(21) Appl. No.: 16/848,263

(22) Filed: Apr. 14, 2020

(65) Prior Publication Data

US 2021/0172503 A1 Jun. 10, 2021

(30) Foreign Application Priority Data

Dec. 9, 2019 (KR) .......................... 10-2019-0162992

(51) Int. Cl.
*F16H 3/66* (2006.01)

(52) U.S. Cl.
CPC ....... *F16H 3/66* (2013.01); *F16H 2200/0065* (2013.01); *F16H 2200/201* (2013.01); *F16H 2200/2041* (2013.01); *F16H 2200/2064* (2013.01); *F16H 2200/2094* (2013.01)

(58) Field of Classification Search
CPC ....... F16H 2200/201; F16H 2200/2043; F16H 2200/2064; F16H 2200/2094; F16H 3/66
See application file for complete search history.

(56) References Cited

FOREIGN PATENT DOCUMENTS

| DE | 102012216230 A1 * | 3/2014 | ............. F16H 3/66 |
| DE | 102014218625 A1 * | 3/2016 | ............. B60K 6/365 |
| EP | 3100888 A1 * | 12/2016 | ............. F16H 3/725 |
| WO | WO-2017092997 A1 * | 6/2017 | ............. F16H 3/666 |

* cited by examiner

*Primary Examiner* — Stacey A Fluhart
(74) *Attorney, Agent, or Firm* — Lempia Summerfield Katz LLC

(57) ABSTRACT

A power transmission apparatus for a hybrid electric vehicle may employ two clutches, two brakes, a dog clutch unit to a planetary gear train of having three planetary gear sets, and thereby provide various shifting modes such as an engine mode and a parallel hybrid mode of multiple shift-stages, an electronically-controlled continuously variable shifting mode, and an electric vehicle mode.

10 Claims, 3 Drawing Sheets

FIG. 2

| MODE | Shift-stage | C1 | C2 | B1 | B2 | CG | |
|---|---|---|---|---|---|---|---|
| | | | | | | G3 | G6 |
| Engine Mode/ Parallel Hybrid Mode | D1 | ● | | ● | | ● | |
| | D2 | ● | | | ● | | |
| | D3 | ● | | ● | | | ● |
| | D4 | ● | ● | | | | |
| | D5 | | ● | ● | | | ● |
| | D6 | | ● | | ● | | |
| eCVT Mode | D1 | | ● | | | | |
| | D2 | | | ● | | | ● |
| EV Mode | D1 | | | ● | | ● | |
| | D2 | | | | ● | | |

POWER TRANSMISSION APPARATUS FOR HYBRID ELECTRIC VEHICLE

CROSS-REFERENCE TO RELATED APPLICATION

This application claims priority to and the benefit of Korean Patent Application No. 10-2019-0162992, filed on Dec. 9, 2019, the entire contents of which are incorporated herein by reference.

FIELD

The present disclosure relates to a power transmission apparatus for a hybrid electric vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to achieve environmental and fuel efficiency regulations.

Therefore, car makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electric energy are mixed and used as the power sources.

In the hybrid electric vehicle, an EV mode in which the hybrid electric vehicle is driven by only the motor, an HEV mode using both the engine and the motor, and an ENG mode using only the engine can be implemented according to the combination of the engine and the motor. Further, the hybrid electric vehicle can acquire a significant fuel efficiency enhancement effect as compared with the existing vehicle through idle stop of stopping the engine when the vehicle stops, fuel saving by regenerative braking that drives a generator by using kinetic energy of the vehicle instead of braking by the existing friction when the vehicle is braked, and stores in a battery electric energy generated at the time of driving the generator and reuses the stored electric energy in driving the vehicle, and the like.

A transmission for hybrid electric vehicle performs shifting operation based on torques of the engine and the motor/generator. Such a transmission may include: an engine clutch selectively connected to the engine, and a conventional six-speed automatic transmission, thereby realizing multi-speed (e.g., six speeds) in each of the EV mode, the HEV mode and the ENG mode.

Such a transmission for a hybrid electric vehicle may typically include three planetary gear sets, six operational elements, and at least one one-way clutch OWC, similarly to a conventional six-speed automatic transmission, as well as the additional engine clutch. By such a scheme, the transmission for a hybrid electric vehicle may not be understood to be best optimized for a hybrid electric vehicle, and may be improved to provide better efficiency, better performance, and better fuel consumption, and/or less production cost.

The above information disclosed in this Background section is only for enhancement of understanding of the background of the present disclosure and therefore it may contain information that does not form the prior art that is already known to a person of ordinary skill in the art.

SUMMARY

An exemplary power transmission apparatus for a hybrid electric vehicle having power sources of an engine and a motor-generator may include: an input shaft, a first planetary gear set, a second planetary gear set, a third planetary gear set, a plurality of shafts, a plurality of engagement elements, and a dog clutch unit. The input shaft may receive a torque from the engine. The first planetary gear set may be disposed on the input shaft and may have first, second, and third rotation elements, where two rotation elements among the first, second, and third rotation elements are selectively connected to the input shaft. The second planetary gear set may be disposed on the input shaft and may have fourth, fifth, and sixth rotation elements, two rotation elements among the fourth, fifth, and sixth rotation elements are fixedly connected to two rotation elements of the first, second, and third rotation elements of the first planetary gear set, one rotation element among the fourth, fifth, and sixth rotation elements is selectively connected to a transmission housing, and another rotation element among the fourth, fifth, and sixth rotation elements is fixedly connected to an output gear. The third planetary gear set may be disposed on the input shaft and may have seventh, eighth, and ninth rotation elements, where one rotation element among the seventh, eighth, and ninth rotation elements is fixedly connected to the input shaft and remaining two rotation elements among the seventh, eighth, and ninth rotation elements are selectively connected to the transmission housing. Each of the plurality of shafts may be fixedly connected to at least one rotation element of the first to ninth rotation elements. The dog clutch unit may include a dog clutch for selectively connecting one shaft of the plurality of shafts to another two shafts of the plurality of shafts.

The plurality of shafts may include first to seventh shafts. The first shaft may be fixedly connected to the first rotation element, fixedly connected to the motor-generator, and fixedly connected to the input shaft. The second shaft may be fixedly connected to the second rotation element and the sixth rotation element and fixedly connected to the output gear. The third shaft may be fixedly connected to the third rotation element and the fifth rotation element and selectively connected to the input shaft. The fourth shaft may be fixedly connected to the fourth rotation element and the eighth rotation element, and may be selectively connected to the transmission housing. The fifth shaft may be fixedly connected to the seventh rotation element and fixedly connected to the input shaft. The sixth shaft may be fixedly connected to the ninth rotation element. The seventh shaft may be arranged between the second and third planetary gear sets and selectively connected to the transmission housing.

The plurality of engagement elements may include a first clutch arranged between the first shaft and the input shaft, a second clutch arranged between the second shaft and the input shaft, a first brake arranged between the seventh shaft and the transmission housing, and a second brake arranged between the fourth shaft and the transmission housing.

The dog clutch unit may include: a seventh-shaft gear formed at an interior circumference of the seventh shaft, a third-shaft gear formed at an exterior circumference of the third shaft, a sixth-shaft gear formed at an exterior circumference of the sixth shaft, and a clutch gear selectively connecting the seventh shaft to the third shaft or the sixth shaft by being always engaged with the seventh-shaft gear and being selectively engaged with the third-shaft gear and the sixth-shaft gear.

The first planetary gear set is a single pinion planetary gear set, and the first, second, and third rotation elements are respectively a first sun gear, a first planet carrier, and a first ring gear. The second planetary gear set is a single pinion planetary gear set, and the fourth, fifth, and sixth rotation elements are respectively a second sun gear, a second planet carrier, and a second ring gear. The third planetary gear set is a single pinion planetary gear set, and the seventh, eighth, and ninth rotation elements are respectively a third sun gear, a third planet carrier, and a third ring gear.

The power transmission apparatus for a hybrid electric vehicle may provide a plurality of shifting modes that includes: an engine mode and a parallel hybrid mode respectively providing six shift-stages; two electronically-controlled continuously variable shifting modes; and an electric vehicle mode providing two shift-stages.

The plurality of shafts may include: a first shaft fixedly connected to the first rotation element, fixedly connected to the motor/generator, and fixedly connected to the input shaft; a second shaft fixedly connected to the third rotation element, the fourth rotation element, and the eighth rotation element, and selectively connected to the transmission housing; a third shaft fixedly connected to the second rotation element and the fifth rotation element; a fourth shaft fixedly connected to the sixth rotation element and fixedly connected to the output gear; a fifth shaft fixedly connected to the seventh rotation element and fixedly connected to the input shaft; a sixth shaft fixedly connected to the ninth rotation element; and a seventh shaft arranged between the second and third planetary gear sets and selectively connected to the transmission housing.

The plurality of engagement elements may include: a first clutch arranged between the first shaft and the input shaft, a second clutch arranged between the third shaft and the input shaft, a first brake arranged between the seventh shaft and the transmission housing, and a second brake arranged between the second shaft and the transmission housing.

The dog clutch unit may include: a seventh-shaft gear formed at an interior circumference of the seventh shaft, a third-shaft gear formed at an exterior circumference of the third shaft, a sixth-shaft gear formed at an exterior circumference of the sixth shaft, and a clutch gear selectively connecting the seventh shaft to the third shaft or the sixth shaft by being always engaged with the seventh-shaft gear and being selectively engaged with the third-shaft gear and the sixth-shaft gear.

According to another form of the present disclosure, a power transmission apparatus for a hybrid electric vehicle, by employing two clutches, two brakes, and a bi-directional dog clutch to three planetary gear sets, the number of required wet-type clutches may be reduced or minimized, and thereby transmission may be simplified. Furthermore, various shifting modes, such as an engine mode (or a parallel hybrid mode) providing six shift-stages, two electronically-controlled continuously variable shifting modes (eCVT modes), and an electric vehicle mode (EV mode) providing two shift-stages, may be realized, thereby improving power delivery efficiency, achieving cost-reduction, and improving fuel-mileage and power performance.

The number of wet-type clutches may be decreased by at least two, with respect to a six-speed transmission, and therefore, an overall length may be decreased, and vehicle installability may be improved.

In addition, by employing the dog clutch unit, the number of unengaged wet-type clutches may be decreased, and thereby power delivery efficiency may be improved. At the same time, an eCVT mode providing both low and high gear stages may be provided, and therefore, fuel consumption may be improved by the eCVT mode for city-driving circumstances.

Since the dog clutch unit is combined with the brake, the neutral state of the dog clutch unit may be utilized while the brake is released, and thereby the drag loss of the brake may be reduced or minimized.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart of a power transmission apparatus for a hybrid electric vehicle according to a first exemplary form of the present disclosure.

Figure 1:
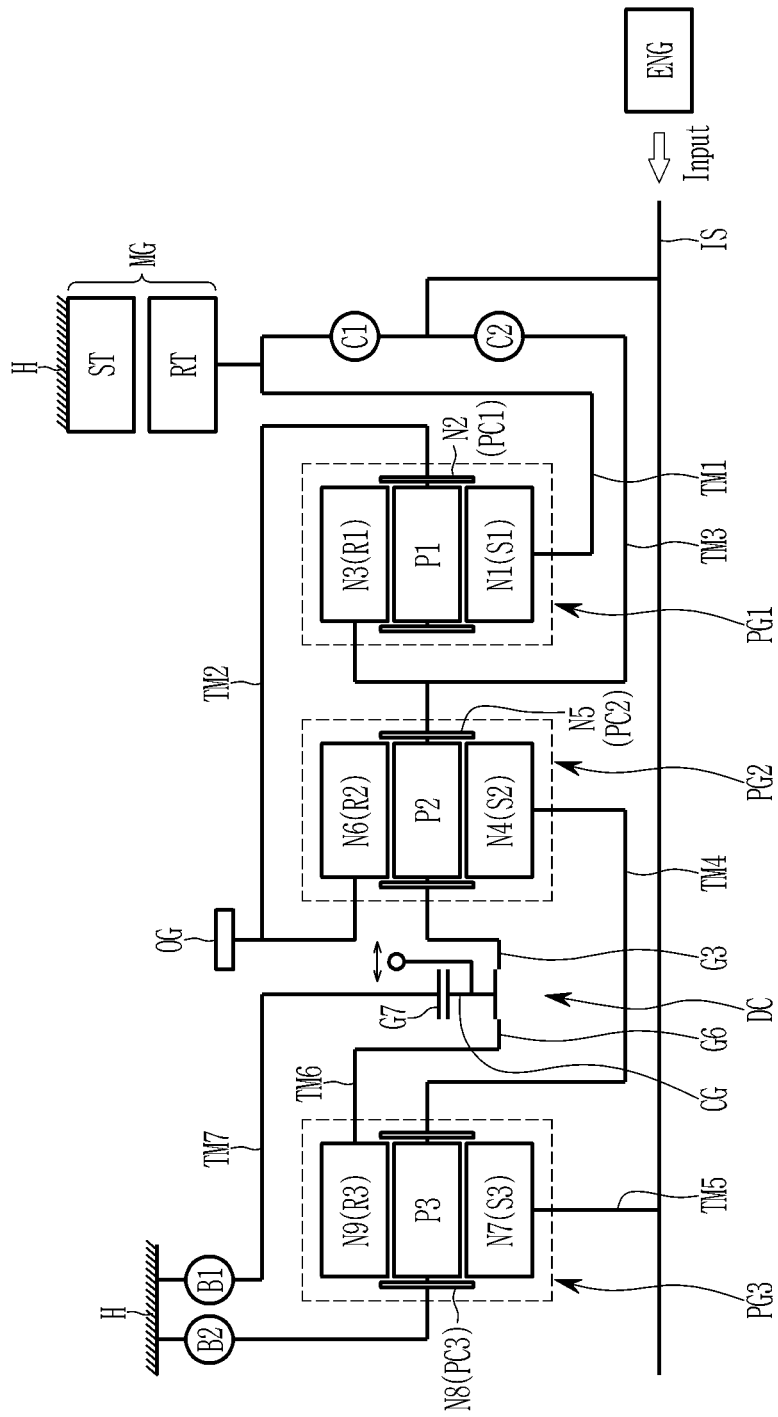
FIG. 1 is a schematic diagram of a power transmission apparatus for a hybrid electric vehicle according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In the following description, dividing names of components into first, second and the like is to divide the names because the names of the components are the same as each other and an order thereof is not particularly limited.

FIG. 1 is a schematic diagram of a power transmission apparatus for a hybrid electric vehicle according to a first exemplary form of the present disclosure.

Referring to FIG. 1, the power transmission apparatus uses power sources of an engine ENG and a motor/generator MG, and includes: an input shaft IS, first, second, and third planetary gear sets PG1, PG2, and PG3 configured to receive torques of the engine ENG and the motor/generator MG and outputting a shifted torque of six shift-stages through an output gear OS, seven shafts TM1 to TM7, a plurality of engagement elements, and a dog clutch unit DC.

The torque of the engine ENG is input to the input shaft IS. For example, the input shaft IS may always receive the torque of the engine ENG.

The engine ENG is a primary power source, and may be implemented as one of various types such as a gasoline engine or a diesel engine.

Although FIG. 1 illustrates that the engine ENG is disposed to the right in the drawing, it may be understood that the engine ENG may be disposed to the left in the drawing.

The motor/generator MG is fixedly connected to the first planetary gear set PG1 and is used as an auxiliary power source.

The motor/generator MG may act as a motor and also as a generator, and includes a stator ST and a rotor RT, where the stator ST is fixed to a transmission housing H, and the rotor RT is disposed within the stator ST and rotatable relatively to the stator ST.

The first planetary gear set PG1 is a single pinion planetary gear set, and includes a first sun gear S1 as a first rotation element N1, a first planet carrier PC1 as a second rotation element N2 rotatably supporting a plurality of first pinion gears P1 externally engaged with the first sun gear S1, and a third rotation element N3 of a first ring gear R1 internally engaged with the plurality of first pinion gears P1.

The second planetary gear set PG2 is a single pinion planetary gear set, and includes a second sun gear S2 as a fourth rotation element N4, a second planet carrier PC2 as a fifth rotation element N5 rotatably supporting a plurality of second pinion gears P2 externally engaged with the second sun gear S2, and a sixth rotation element N6 of a second ring gear R2 internally engaged with the plurality of second pinion gears P2.

The third planetary gear set PG3 is a single pinion planetary gear set, and includes a third sun gear S3 as a seventh rotation element N7, a third planet carrier PC3 as an eighth rotation element N8 rotatably supporting a plurality of third pinion gears P3 externally engaged with the third sun gear S3, and a ninth rotation element N9 of a third ring gear R3 internally engaged with the plurality of third pinion gears P3.

In an arrangement of the first, second, and third planetary gear sets PG1, PG2, and PG3, the second rotation element N2 and the sixth rotation element N6 are fixedly interconnected, the third rotation element N3 and the fifth rotation element N5 are fixedly interconnected, the fourth rotation element N4 and the eighth rotation element N8 are fixedly interconnected.

Each of the seven shafts TM1 to TM7 may be a rotational member that is fixedly or selectively connected to at least one rotation element of the first, second, and third planetary gear sets PG1, PG2, and PG3.

A first shaft TM1 is fixedly connected to the first rotation element N1 (first sun gear S1), fixedly connected to the motor/generator MG, and selectively connected to the input shaft IS.

That is, the first shaft TM1 acts as an input element always receiving the torque of the motor/generator MG, and also as an input element selectively receiving the torque of the input shaft IS, i.e., the torque of the engine ENG.

A second shaft TM2 is fixedly connected to the second rotation element N2 (first planet carrier PC1), fixedly connected to the sixth rotation element N6 (second ring gear R2), and fixedly connected to the output gear OG, thereby always acting as an output element.

A third shaft TM3 is fixedly connected to the third rotation element N3 (first ring gear R1) and the fifth rotation element N5 (second planet carrier PC2), and selectively connected to the input shaft IS.

That is, the third shaft TM3 selectively acts as an input element that selectively receives the torque of the input shaft IS.

A fourth shaft TM4 is fixedly connected to the fourth rotation element N4 (second sun gear S2) and the eighth rotation element N8 (third planet carrier PC3), and selectively connected to the transmission housing H, thereby selectively acting as a fixed element.

A fifth shaft TM5 is fixedly connected to the seventh rotation element N7 (third sun gear S3), and fixedly connected to the input shaft IS, thereby always acting as an input element.

A sixth shaft TM6 is fixedly connected to the ninth rotation element N9 (third ring gear R3).

A seventh shaft TM7 is disposed between the second and third planetary gear sets PG2 and PG3 to be selectively connected to the third shaft TM3 and the sixth shaft TM6, and is selectively connected to the transmission housing H, thereby selectively acting as a fixed element, possibly together with the third shaft TM3 or the sixth shaft TM6.

In the disclosure, when two or more members are described to be "fixedly connected" or the like, where the members may be anyone of a shaft, an input shaft, an output shaft, a rotational member, and a transmission housing, it means that the fixedly connected members always rotate at a same speed.

When two or more members are described to be "selectively connected" by an engagement element, it means that the selectively connected members rotates separately when the engagement element is not engaged, and rotates at a same speed when the engagement element is engaged.

It may be understood that in the case that a member is "selectively connected" with a transmission housing by an engagement element, the member may be stationary when the engagement element is engaged.

Engagement elements of first and second clutches C1 and C2 and a dog clutch unit DC are arranged between a corresponding pair of the seven shafts TM1 to TM7 and the input shaft, so as to form selective connections Engagement elements of first and second brakes B1 and B2 are arranged between the transmission housing H and a corresponding shaft of the seven shafts TM1 to TM7, so as to form selective connections The first clutch C1 is arranged between the first shaft TM1 and the input shaft IS, and selectively connects the first shaft TM1 and the input shaft IS, thereby controlling power delivery therebetween.

The second clutch C2 is arranged between the second shaft TM2 and the input shaft IS, and selectively connects the second shaft TM2 and the input shaft IS, thereby controlling power delivery therebetween.

The first brake B1 is arranged between the seventh shaft TM7 and the transmission housing H, and selectively connects the seventh shaft TM7 to the transmission housing H.

The second brake B2 is arranged between the fourth shaft TM4 and the transmission housing H, and selectively connects the fourth shaft TM4 to the transmission housing H.

The engagement elements of the first and second clutches C1 and C2 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

The dog clutch unit DC includes a seventh-shaft gear G7 formed at an interior circumference of the seventh shaft TM7, a third-shaft gear G3 formed at an exterior circumference of the third shaft TM3, a sixth-shaft gear G6 formed at an exterior circumference of the sixth shaft TM6, and a clutch gear CG arranged between the three gears G7, G3, and G6.

The clutch gear CG always remains externally engaged with the seventh shaft TM7, and moves left and right in the drawing, e.g., by an actuator (not shown) provided at an exterior of the transmission or by an internal hydraulic pressure of the transmission. By such an axial movement, the clutch gear CG is selectively engaged with an exterior circumference of the third-shaft gear G3 or the sixth-shaft gear G6, thereby selectively connecting the third shaft TM3 and the sixth shaft TM6 to the seventh shaft TM7.

FIG. 2 is an operational chart of a power transmission apparatus for a hybrid electric vehicle according to a first exemplary form.

Referring to FIG. 2, a power transmission apparatus for a hybrid electric vehicle according to a first exemplary form may realize an engine mode (parallel hybrid mode) forming six shift-stages, an eCVT mode forming two electronic continuously variable shifting, and an EV mode forming two shift-stages.

Hereinafter, an operation of a power transmission apparatus for a hybrid electric vehicle according to an exemplary form is described in connection with respective modes It may be understood that the parallel hybrid mode is similar to the engine mode except that the motor/generator MG is also driven in addition to driving of the engine ENG.

[Engine Mode Forward First Speed (Parallel Hybrid Mode Forward First Speed)]

In an engine mode forward first speed D1, the engine ENG is driven, the clutch gear CG of the dog clutch unit DC engages the seventh-shaft gear G7 and the third-shaft gear G3, and the first clutch C1 and the first brake B1 are simultaneously operated.

Then, in the first, second, and third planetary gear sets PG1, PG2, and PG3, the third shaft TM3 acts as a fixed element since the first brake B1 is operated and the clutch gear CG of the dog clutch unit DC connects the seventh-shaft gear G7 and the third-shaft gear G3. In such a state, by the operation of the first clutch C1, the torque of the engine ENG is input to the first and seventh rotation elements N1 and N7 through the first shaft TM1 and the fifth shaft TM5.

As a result, a reduced speed output is delivered to the sixth rotation element N6, and the torque of the engine mode forward first speed D1 is output through the output gear OG connected to the sixth rotation element N6 by the second shaft TM2.

Here, when the motor/generator MG is additionally driven, the torque of the motor/generator MG is added to first shaft TM1, and thereby the parallel hybrid mode forward first speed may be realized.

[Engine Mode Forward Second Speed (Parallel Hybrid Mode Forward Second Speed)]

In an engine mode forward second speed D2, the engine ENG is driven, and the first clutch C1 and the second brake B2 are simultaneously operated.

Then, in the first, second, and third planetary gear sets PG1, PG2, and PG3, the fourth shaft TM4 acts as a fixed element by the operation of the second brake B2. In such a state, by the operation of the first clutch C1, the torque of the engine ENG is input to the first and seventh rotation elements N1 and N7 through the first shaft TM1 and the fifth shaft TM5.

As a result, a reduced speed output is delivered to the sixth rotation element N6, and the torque of the engine mode forward second speed D2 is output through the output gear OG connected to the sixth rotation element N6 by the second shaft TM2.

Here, when the motor/generator MG is additionally driven, the torque of the motor/generator MG is added to first shaft TM1, and thereby the hybrid mode forward second speed may be realized.

[Engine Mode Forward Third Speed (Parallel Hybrid Mode Forward Third Speed)]

In an engine mode forward third speed D3, the engine ENG is driven, the clutch gear CG of the dog clutch unit DC engages the seventh-shaft gear G7 and the sixth-shaft gear G6, and the first clutch C1 and the first brake B1 are simultaneously operated.

Then, in the first, second, and third planetary gear sets PG1, PG2, and PG3, the sixth shaft TM6 acts as a fixed element since the first brake B1 is operated and the clutch gear CG of the dog clutch unit DC connects the seventh-shaft gear G7 and the sixth-shaft gear G6. In such a state, by the operation of the first clutch C1, the torque of the engine ENG is input to the first and seventh rotation elements N1 and N7 through the first shaft TM1 and the fifth shaft TM5.

As a result, a reduced speed output is delivered to the sixth rotation element N6, and the torque of the engine mode forward third speed D3 is output through the output gear OG connected to the sixth rotation element N6 by the second shaft TM2.

Here, when the motor/generator MG is additionally driven, the torque of the motor/generator MG is added to first shaft TM1, and thereby the parallel hybrid mode forward third speed may be realized.

[Engine Mode Forward Fourth Speed (Parallel Hybrid Mode Forward Fourth Speed)]

In an engine mode forward fourth speed D4, the engine ENG is driven, and the first and second clutches C1 and C2 are simultaneously operated.

Then, in the first, second, and third planetary gear sets PG1, PG2, and PG3, by the operation of the first and second clutches C1 and C2, the torque of the engine ENG is simultaneously input to the first, third, fifth, and seventh rotation elements N1, N3, N5, and N7 through the first shaft TM1, the second shaft TM2, and the fifth shaft TM5.

As a result, first, second, and third planetary gear sets PG1, PG2, and PG3 integrally rotate, and the torque of the engine mode forward fourth speed D4, which is the same as the input torque, is output through the output gear OG connected to the sixth rotation element N6 by the second shaft TM2.

Here, when the motor/generator MG is additionally driven, the torque of the motor/generator MG is added to first shaft TM1, and thereby the hybrid mode forward fourth speed may be realized.

[Engine Mode Forward Fifth Speed (Parallel Hybrid Mode Forward Fifth Speed)]

In an engine mode forward fifth speed D5, the engine ENG is driven, the clutch gear CG of the dog clutch unit DC engages the seventh-shaft gear G7 and the sixth-shaft gear G6, and the second clutch C2 and the first brake B1 are simultaneously operated.

Then, in the first, second, and third planetary gear sets PG1, PG2, and PG3, the sixth shaft TM6 acts as a fixed element since the first brake B1 is operated and the clutch gear CG of the dog clutch unit DC connects the seventh-shaft gear G7 and the sixth-shaft gear G6. In such a state, by the operation of the second clutch C2, the torque of the engine ENG is input to the third, fifth, and seventh rotation elements N3, N5, and N7 through the second shaft TM2 and the fifth shaft TM5.

As a result, an increased speed output is delivered to the sixth rotation element N6, and the torque of the engine mode forward fifth speed D5 is output through the output gear OG connected to the sixth rotation element N6 by the second shaft TM2.

Here, when the motor/generator MG is additionally driven, the torque of the motor/generator MG is added to first shaft TM1, and thereby the parallel hybrid mode forward fifth speed may be realized.

[Engine Mode Forward Sixth Speed (Parallel Hybrid Mode Forward Sixth Speed)]

In an engine mode forward sixth speed D6, the engine ENG is driven, and the second clutch C2 and the second brake B2 are simultaneously operated.

Then, in the first, second, and third planetary gear sets PG1, PG2, and PG3, the fourth shaft TM4 acts as a fixed element by the operation of the second brake B2. In such a state, by the operation of the second clutch C2, the torque of the engine ENG is input to the third, fifth, and seventh rotation elements N3, N5, and N7 through the second shaft TM2 and the fifth shaft TM5.

As a result, an increased speed output is delivered to the sixth rotation element N6, and the torque of the engine mode forward sixth speed D6 is output through the output gear OG connected to the sixth rotation element N6 by the second shaft TM2.

Here, when the motor/generator MG is additionally driven, the torque of the motor/generator MG is added to first shaft TM1, and thereby the hybrid mode forward sixth speed may be realized.

[eCVT Mode First Speed]

In the eCVT mode first speed D1, the engine ENG is driven at a fixed rotation speed. In this state, the motor/generator MG is driven, and the second clutch C2 is operated.

Then, in the first, second, and third planetary gear sets PG1, PG2, and PG3, the torque of the engine ENG is input to the seventh rotation element N7 through the fifth shaft TM5. In such a state, by the operation of the second clutch C2, the torque of the engine ENG is delivered to the third and fifth rotation elements N3 and N5 through the third shaft TM3, and simultaneously, the torque of the motor/generator MG is delivered to the first rotation element N1 through the first shaft TM1.

In such a state, by varying the rotation speed of the motor/generator MG, the eCVT mode first speed D1 for a gear ratio appropriate for a high gear may be realized.

[eCVT Mode Second Speed]

In the eCVT mode second speed D2, the engine ENG is driven at a fixed rotation speed. In this state, the motor/generator MG is driven, the clutch gear CG of the dog clutch unit DC engages the seventh-shaft gear G7 and the sixth-shaft gear G6, and the first brake B1 is operated.

Then, in the first, second, and third planetary gear sets PG1, PG2, and PG3, the torque of the engine ENG is input to the seventh rotation element N7 through the fifth shaft TM5, and the sixth shaft TM6 acts as a fixed element since the first brake B1 is operated and the clutch gear CG of the dog clutch unit DC connects the seventh-shaft gear G7 and the sixth-shaft gear G6. In such a state, simultaneously, the torque of the motor/generator MG is delivered to the first rotation element N1 through the first shaft TM1.

In such a state, by varying the rotation speed of the motor/generator MG, the eCVT mode second speed D2 for a gear ratio appropriate for a low gear may be realized.

[EV Mode First Speed]

In the EV mode first speed D1, the motor/generator MG is driven, the clutch gear CG of the dog clutch unit DC engages the seventh-shaft gear G7 and the third-shaft gear G3, and the first brake B1 is operated.

Then, in the first, second, and third planetary gear sets PG1, PG2, and PG3, the third shaft TM3 acts as a fixed element since the first brake B1 is operated and the clutch gear CG of the dog clutch unit DC connects the seventh-shaft gear G7 and the third-shaft gear G3. In such a state, the torque of the motor/generator MG is input to the first rotation element N1 through the first shaft TM1.

As a result, a reduced speed output is delivered to the sixth rotation element N6, and the torque of the EV mode first speed D1 is output through the output gear OG connected to the sixth rotation element N6 by the second shaft TM2.

[EV Mode Second Speed]

In the EV mode second speed D2, the motor/generator MG is driven, and the second brake B2 is operated.

Then, in the first, second, and third planetary gear sets PG1, PG2, and PG3, the fourth shaft TM4 acts as a fixed element by the operation of the second brake B2. In such a state, the torque of the motor/generator MG is input to the first rotation element N1 through the first shaft TM1.

As a result, a reduced speed output is delivered to the sixth rotation element N6, and the torque of the EV mode second speed D2 is output through the output gear OG connected to the sixth rotation element N6 by the second shaft TM2.

Here, when the engine mode (or the parallel hybrid mode) and the eCVT mode are combined, a shifting mode providing at least seven speeds in addition to the engine mode having six shift-stages.

Figure 3:
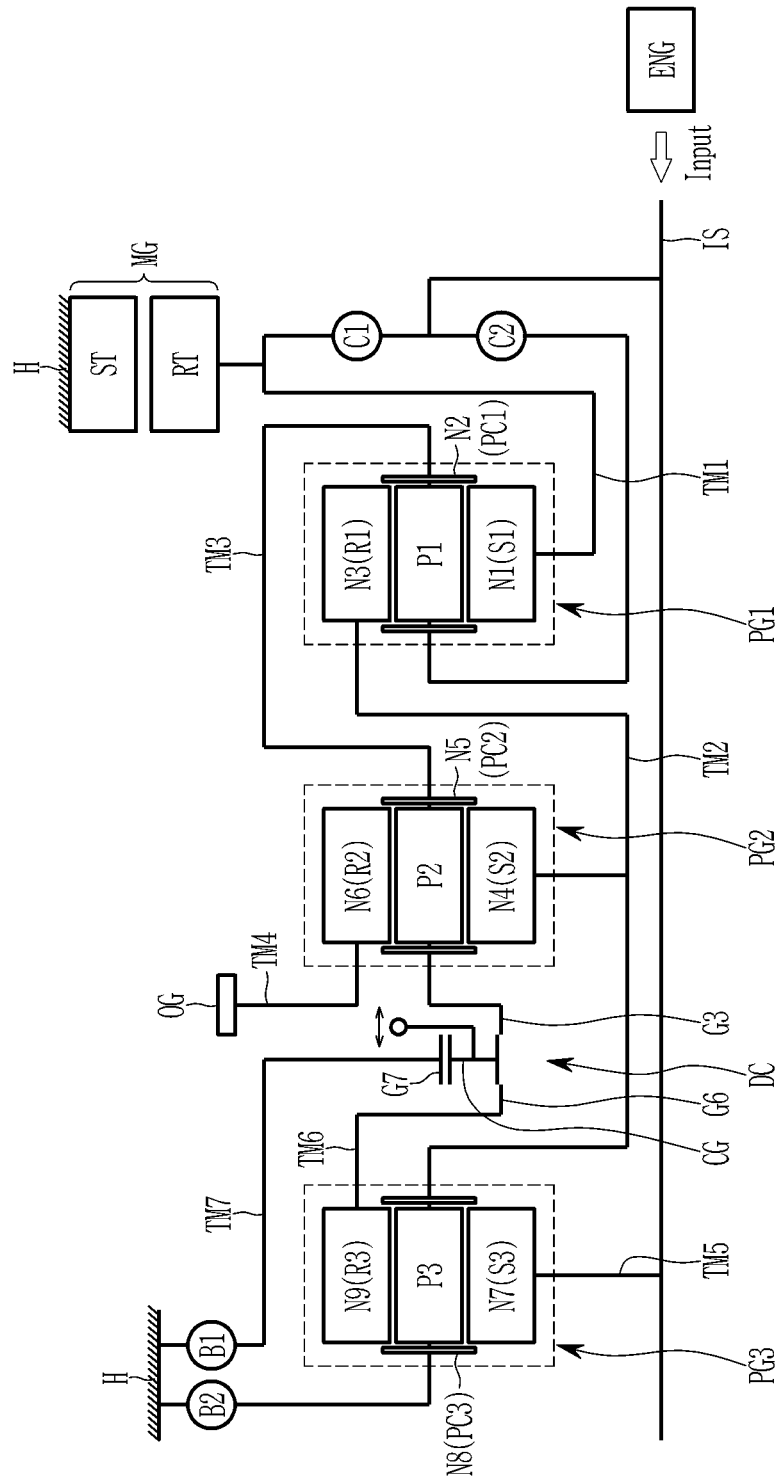
FIG. 3 is a schematic diagram of a power transmission apparatus for a hybrid electric vehicle according to a second exemplary form of the present disclosure.

FIG. 3 is a schematic diagram of a power transmission apparatus for a hybrid electric vehicle according to a second exemplary form.

Referring to FIG. 3, the power transmission apparatus according to the second exemplary form differs from the first exemplary form in fixed interconnection of rotation elements of the first, second, and third planetary gear sets PG1, PG2, and PG3.

In the first exemplary form, the second rotation element N2 and the sixth rotation element N6 are fixedly interconnected, the third rotation element N3 and the fifth rotation element N5 are fixedly interconnected, and the fourth rotation element N4 and the eighth rotation element N8 are fixedly interconnected. However, in the second exemplary form, the second rotation element N2 is fixedly connected to the fifth rotation element N5, and the third rotation element N3, the fourth rotation element N4, and the eighth rotation element N8 are fixedly interconnected.

As a result, the first shaft TM1, the fifth shaft TM5, the sixth shaft TM6, and the seventh shaft TM7 are the same in connections to rotation elements in comparison with first exemplary form. The second exemplary form differs from the first exemplary form in rotation elements to which the second shaft TM2, the third shaft TM3, and the fourth shaft TM4 are connected.

That is, according to the second exemplary form, the second shaft TM2 is fixedly connected to the third rotation element N3 (first ring gear R1), the fourth rotation element N4 (second sun gear S2), and the eighth rotation element N8 (third planet carrier PC3), and selectively connected to the transmission housing H through the second brake B2, thereby selectively acting as a fixed element.

In addition, the third shaft TM3 is fixedly connected to the second rotation element N2 (first planet carrier PC1) and the fifth rotation element N5 (second planet carrier PC2), and selectively connected to the transmission housing H through the dog clutch unit DC and the first brake B1, thereby selectively acting as a fixed element.

The fourth shaft TM4 is fixedly connected to the sixth rotation element N6 (second ring gear R2), and fixedly connected to the output gear OG, thereby always acting as an output element.

As such, the second exemplary form differs from the first exemplary form in the rotation elements to which the second shaft TM2, the third shaft TM3, and the fourth shaft TM4 are fixedly connected, and other features remain the same.

In addition, shifting modes may be realized the same as in the first exemplary form by the same operational chart.

As described above, according to a power transmission apparatus for a hybrid electric vehicle according to an exemplary form, by employing two clutches, two brakes, and a bi-directional dog clutch to three planetary gear sets, the number of required wet-type clutches may be reduced or minimized, and thereby transmission may be simplified. Furthermore, various shifting modes, such as an engine mode (or a parallel hybrid mode) for six shift-stages, two electronically-controlled continuously variable shifting modes (eCVT modes), and an electric vehicle mode (EV mode) for two shift-stages, may be realized, thereby improving power delivery efficiency.

The number of wet-type clutches may be decreased by at least two, with respect to a six-speed transmission, and therefore, an overall length may be decreased, vehicle installability may be improved, production cost may be decreased, while maintaining equal or better fuel consumption characteristic and power performance.

In addition, by employing the dog clutch unit, the number of unengaged wet-type clutches may be decreased, and thereby power delivery efficiency may be improved. At the same time, an eCVT mode providing both low and high gear stages may be provided, and therefore, fuel consumption may be improved by the eCVT mode for city-driving circumstances.

Since the dog clutch unit DC is combined with the first brake B1, the neutral state of the dog clutch unit DC may be utilized while the first brake B1 is released, and thereby the drag loss of the first brake B1 may be reduced or minimized.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

IS: input shaft
OG: output gear
PG1, PG2, PG3: first, second, and third planetary gear sets
MG: motor/generator
B1, B2: first and second brakes
C1, C2: first and second clutches
TM1, TM2, TM3, TM4, TM5, TM6, TM7: first, second, third, fourth, fifth, sixth, and seventh shafts
DC: dog clutch unit

What is claimed is:

1. A power transmission apparatus for a hybrid electric vehicle having power sources of an engine and a motor-generator, the power transmission apparatus comprising:
   an input shaft configured to receive a torque from the engine;
   a first planetary gear set disposed on the input shaft and having first, second, and third rotation elements, where two rotation elements among the first, second, and third rotation elements are selectively connected to the input shaft;
   a second planetary gear set disposed on the input shaft and having fourth, fifth, and sixth rotation elements, where two rotation elements among the fourth, fifth, and sixth rotation elements are fixedly connected to two rotation elements of the first, second, and third rotation elements of the first planetary gear set, and one rotation element among the fourth, fifth, and sixth rotation elements is selectively connected to a transmission housing, and another rotation element among the fourth, fifth, and sixth rotation elements is fixedly connected to an output gear;
   a third planetary gear set disposed on the input shaft and having seventh, eighth, and ninth rotation elements, where one rotation element among the seventh, eighth, and ninth rotation elements is fixedly connected to the input shaft and remaining two rotation elements among the seventh, eighth, and ninth rotation elements are selectively connected to the transmission housing;
   a plurality of shafts each being fixedly connected to at least one rotation element of the first to ninth rotation elements;
   a plurality of engagement elements; and
   a dog clutch unit including a dog clutch configured to selectively connect one shaft of the plurality of shafts to another two shafts of the plurality of shafts,
   wherein the plurality of shafts comprises:
      a first shaft fixedly connected to the first rotation element, fixedly connected to the motor-generator, and selectively connected to the input shaft;
      a second shaft fixedly connected to the second rotation element and the sixth rotation element and fixedly connected to the output gear;
      a third shaft fixedly connected to the third rotation element and the fifth rotation element and selectively connected to the input shaft;
      a fourth shaft fixedly connected to the fourth rotation element and the eighth rotation element, and selectively connected to the transmission housing;
      a fifth shaft fixedly connected to the seventh rotation element and fixedly connected to the input shaft;
      a sixth shaft fixedly connected to the ninth rotation element; and
      a seventh shaft arranged between the second and third planetary gear sets and selectively connected to the transmission housing.

2. The power transmission apparatus of claim 1, wherein the plurality of engagement elements comprises:
- a first clutch arranged between the first shaft and the input shaft;
- a second clutch arranged between the second shaft and the input shaft;
- a first brake arranged between the seventh shaft and the transmission housing; and
- a second brake arranged between the fourth shaft and the transmission housing.

3. The power transmission apparatus of claim 2, wherein the dog clutch unit comprises:
- a seventh-shaft gear formed at an interior circumference of the seventh shaft;
- a third-shaft gear formed at an exterior circumference of the third shaft;
- a sixth-shaft gear formed at an exterior circumference of the sixth shaft; and
- a clutch gear configured to selectively connect the seventh shaft to the third shaft or the sixth shaft by being always engaged with the seventh-shaft gear and being selectively engaged with the third-shaft gear and the sixth-shaft gear.

4. The power transmission apparatus of claim 3, wherein:
the first planetary gear set is a single pinion planetary gear set, and the first, second, and third rotation elements are respectively a first sun gear, a first planet carrier, and a first ring gear of the first planetary gear set;
the second planetary gear set is a single pinion planetary gear set, and the fourth, fifth, and sixth rotation elements are respectively a second sun gear, a second planet carrier, and a second ring gear of the second planetary gear set; and
the third planetary gear set is a single pinion planetary gear set, and the seventh, eighth, and ninth rotation elements are respectively a third sun gear, a third planet carrier, and a third ring gear of the third planetary gear set.

5. The power transmission apparatus of claim 3, wherein the power transmission apparatus is configured to provide a plurality of shifting modes comprising:
- an engine mode and a parallel hybrid mode configured to respectively provide at least six shift-stages;
- at least two electronically-controlled continuously variable shifting modes; and
- an electric vehicle mode configured to provide at least two shift-stages.

6. A power transmission apparatus for a hybrid electric vehicle having power sources of an engine and a motor-generator, the power transmission apparatus comprising:
- an input shaft configured to receive a torque from the engine;
- a first planetary gear set disposed on the input shaft and having first, second, and third rotation elements, where two rotation elements among the first, second, and third rotation elements are selectively connected to the input shaft;
- a second planetary gear set disposed on the input shaft and having fourth, fifth, and sixth rotation elements, where two rotation elements among the fourth, fifth, and sixth rotation elements are fixedly connected to two rotation elements of the first, second, and third rotation elements of the first planetary gear set, and one rotation element among the fourth, fifth, and sixth rotation elements is selectively connected to a transmission housing, and another rotation element among the fourth, fifth, and sixth rotation elements is fixedly connected to an output gear;
- a third planetary gear set disposed on the input shaft and having seventh, eighth, and ninth rotation elements, where one rotation element among the seventh, eighth, and ninth rotation elements is fixedly connected to the input shaft and remaining two rotation elements among the seventh, eighth, and ninth rotation elements are selectively connected to the transmission housing;
- a plurality of shafts each being fixedly connected to at least one rotation element of the first to ninth rotation elements;
- a plurality of engagement elements; and
- a dog clutch unit including a dog clutch configured to selectively connect one shaft of the plurality of shafts to another two shafts of the plurality of shafts,
wherein the plurality of shafts comprises:
- a first shaft fixedly connected to the first rotation element, fixedly connected to the motor-generator, and selectively connected to the input shaft;
- a second shaft fixedly connected to the third rotation element, the fourth rotation element, and the eighth rotation element, and selectively connected to the transmission housing;
- a third shaft fixedly connected to the second rotation element and the fifth rotation element;
- a fourth shaft fixedly connected to the sixth rotation element and fixedly connected to the output gear;
- a fifth shaft fixedly connected to the seventh rotation element and fixedly connected to the input shaft;
- a sixth shaft fixedly connected to the ninth rotation element; and
- a seventh shaft arranged between the second and third planetary gear sets and selectively connected to the transmission housing.

7. The power transmission apparatus of claim 6, wherein the plurality of engagement elements comprises:
- a first clutch arranged between the first shaft and the input shaft;
- a second clutch arranged between the third shaft and the input shaft;
- a first brake arranged between the seventh shaft and the transmission housing; and
- a second brake arranged between the second shaft and the transmission housing.

8. The power transmission apparatus of claim 7, wherein the dog clutch unit comprises:
- a seventh-shaft gear formed at an interior circumference of the seventh shaft;
- a third-shaft gear formed at an exterior circumference of the third shaft;
- a sixth-shaft gear formed at an exterior circumference of the sixth shaft; and
- a clutch gear selectively connecting the seventh shaft to the third shaft or the sixth shaft by being always engaged with the seventh-shaft gear and being selectively engaged with the third-shaft gear and the sixth-shaft gear.

9. The power transmission apparatus of claim 8, wherein:
the first planetary gear set is a single pinion planetary gear set, and the first, second, and third rotation elements are respectively a first sun gear, a first planet carrier, and a first ring gear of the first planetary gear set;
the second planetary gear set is a single pinion planetary gear set, and the fourth, fifth, and sixth rotation elements are respectively a second sun gear, a second planet carrier, and a second ring gear of the second planetary gear set; and the third planetary gear set is a single pinion planetary gear set, and the seventh, eighth, and ninth rotation elements are respectively a third sun gear, a third planet carrier, and a third ring gear of the third planetary gear set.

10. The power transmission apparatus of claim 8, wherein the power transmission apparatus is configured to provide a plurality of shifting modes comprising:

an engine mode and a parallel hybrid mode configured to respectively provide at least six shift-stages;

at least two electronically-controlled continuously variable shifting modes; and an electric vehicle mode configured to provide at least two shift-stages.

\* \* \* \* \*